United States Patent [19]

Saindon et al.

[11] Patent Number: 5,518,559
[45] Date of Patent: May 21, 1996

[54] METHOD AND APPARATUS FOR REGISTRATION OF A SEAL ON A PLASTIC BAG

[75] Inventors: Stephen A. Saindon, Appleton; Peter Gietman, Jr., Combined Locks, both of Wis.

[73] Assignee: CMD Corporation, Appleton, Wis.

[21] Appl. No.: 228,566

[22] Filed: Apr. 15, 1994

Related U.S. Application Data

[63] Continuation-in-part of Ser. No. 105,434, Aug. 12, 1993, abandoned.

[51] Int. Cl.[6] .................................................. B32B 31/00
[52] U.S. Cl. ....................... 156/64; 156/353; 156/360; 156/361; 493/11; 493/29; 493/202; 493/208
[58] Field of Search ........................... 156/64, 353, 360, 156/361, 362; 493/11, 24, 29, 187, 188, 202, 208

[56] References Cited

U.S. PATENT DOCUMENTS

| | | | |
|---|---|---|---|
| 3,360,416 | 12/1967 | Cochrane | 156/353 |
| 3,607,550 | 9/1971 | Ballanger | 156/353 |
| 3,703,590 | 11/1972 | Höller et al. | 156/360 |
| 4,192,705 | 3/1980 | Wech . | |
| 4,216,705 | 8/1980 | Achelpohl et al. . | |
| 4,261,779 | 4/1981 | Wech . | |
| 4,380,446 | 4/1983 | Dickson et al. . | |
| 4,549,917 | 10/1985 | Jensen, Jr. . | |
| 4,581,083 | 4/1986 | Schultz et al. | 156/64 |
| 4,618,391 | 10/1986 | Torti et al. . | |
| 4,642,084 | 2/1987 | Gietman, Jr. . | |
| 4,712,357 | 12/1987 | Crawford . | |
| 4,795,513 | 1/1989 | Jensen, Jr. . | |
| 4,934,993 | 6/1990 | Gietman, Jr. . | |
| 5,000,725 | 3/1991 | Bauknecht . | |
| 5,000,812 | 3/1991 | Murphy . | |
| 5,009,740 | 4/1991 | Yanai | 156/353 |
| 5,017,257 | 5/1991 | Murphy . | |
| 5,094,556 | 3/1992 | Kohler . | |
| 5,292,299 | 3/1994 | Anderson et al. | 493/11 |

FOREIGN PATENT DOCUMENTS

| | | |
|---|---|---|
| 0117623 | 9/1984 | European Pat. Off. . |
| 0419813 | 4/1991 | European Pat. Off. . |
| 3230816 | 2/1984 | Germany . |
| 2-143845 | 1/1990 | Japan . |

*Primary Examiner*—David A. Simmons
*Assistant Examiner*—Paul M. Rivard
*Attorney, Agent, or Firm*—Foley & Lardner

[57] ABSTRACT

A plastic bag making machine includes a cylindrical drum with a variable diameter. A plurality of seal bars define the circumference of the drum, and are substantially parallel to the drum's rotational axis. A controller determines the distance between registration marks on the film using the output of an encoder as a position signal, and adjusts the diameter of the drum in response to the determined distance. The controller also determines the position of the seal bars relative to the registration marks and adjusts the diameter of the drum in response to the relative position. A downstream device includes a perforation to seal registration controller with a registration control input. The controller provides a control signal to the registration control input in response to changes in the diameter of the drum.

14 Claims, 3 Drawing Sheets

METHOD AND APPARATUS FOR REGISTRATION OF A SEAL ON A PLASTIC BAG

RELATED APPLICATION

This application is a continuation-in-part of prior U.S. application Ser. No. 105,434, filed Aug. 12, 1993, now abandoned, entitled "Method And Apparatus For Registration Of A Seal On A Plastic Bag."

FIELD OF THE INVENTION

The invention relates generally to the art of plastic bag making machines. More specifically, the present invention relates to a bag machine which employs a rotary sealing drum. Still more specifically, the present invention relates to a bag machine in which the sealing drum is adjustable in size to produce different bags of different lengths.

BACKGROUND OF THE INVENTION

Many different types of plastic bag making machines are known in the art of producing plastic bags for industrial and individual consumers for many different applications (e.g. small sandwich bags and trash bags). While the present invention has a wide range of applications for the production of such products, the related art will be explained by reference to one particular class of bags i.e., polyethylene trash bags or, garbage bags and wastebasket liners of the type usually sold in boxes of folded bags or rolls of bags.

Further discussion of the history and operation of these machines can be found in U.S. Pat. No. 4,642,084 (the '084 patent) entitled "Plastic Bag Making Machine", issued to the present inventor on Feb. 10, 1987 and assigned to Custom Machinery Design, Inc. The '084 patent discloses a bag machine which includes a rotary drum with seal bars attached thereto and which includes a gear mechanism adapted for analog variation of the drum diameter between a first smaller diameter and a second larger diameter. Manual rotation of a hex nut assembly while the machine is stopped increases or decreases the drum's diameter through a series of appropriately mounted mitre gears and ring gears. Once this adjustment is made, the machine begins operation. Readjustment of the drum diameter can only be accomplished by stopping the machine to adjust the hex nut assembly.

Additionally, very small errors in drum diameter size can lead to acute problems, particularly an accumulating error in the seal to print registration distance every revolution of the drum. An error of a fraction of an inch leads to serious problems when the bag width is only several inches across and the speed of the film moving through the machine is 500–900 bags per minute. By the time the error is detected, a considerable amount of film is wasted.

The control of the spacial relationship between a repetitive print pattern on the web and the repetitive seals the machine is placing across the web is referred to as the "registration" of the seal to the print on the web. This spacial relationship may also be referred to as the "phase" between the repetitive print and seal occurrences on the web.

Similarly, the control of the spacial relationship between the repetitive seals placed across the web and the repetitive perforations the machine is placing across the web is referred to as the "registration" of the perforation to the seal on the web. This spacial relationship may also be referred to as the "phase" between the repetitive perforations and the repetitive seals across the web. The distance between a seal and a perforation is commonly called the "skirt length" of the finished bag.

Another prior art device described in U.S. Pat. No. 4,934,993 (the '993 patent), also issued to Gietman and assigned to the assignee of the present invention, allows for adjusting the drum diameter while the bag making machine is in operation. The '993 patent requires the operator to preset the drum diameter corresponding to the nominal bag length, but will correct for slight variations in the bag length. If the seal is not properly registered to the printing on the bag the diameter of the drum is temporarily increased or decreased. When the registration is correct the drum returns to the preset diameter. One disadvantage of this system is that "hunting" (the drum diameter will continually change) will occur if the average bag varies more than slightly from the preset length. Hunting will be particularly prevalent at higher speeds.

When a bag making machine such as that described in the '993 patent is used to adjust the drum diameter, any device (such as a perforator, die cutter, punching station, or folding station) on the bag making machine that processes the plastic downstream of the drum may become out of proper synchronization with the sealing process occurring in the drum while the drum is changing diameter. For example a perforator will be slightly out of synchronization causing perforation to seals registration (skirt length) to vary. According to the '993 patent the skirt length may be adjusted manually. However, by the time the error is detected and the manual correction made, a considerable amount of film may be wasted.

A bag making machine which overcomes these shortcomings would represent a considerable advancement in the art.

OBJECTS AND SUMMARY OF THE INVENTION

It is a primary object of the present invention to provide a plastic bag making machine which can adjust for different bag sizes without requiring the machine to be stopped and to adjust the registration of downstream process devices.

It is another object of the present invention to provide a plastic bag making machine which automatically compensates for errors in sizing of bags by adjusting its sealing apparatus to the bag size being produced without having to stop the machine.

According to the present invention a plastic bag making machine includes a cylindrical drum with a variable diameter. A plurality of seal bars define the circumference of the drum, and are substantially parallel to the drum's rotational axis. The bags are made from a plastic film that includes registration marks thereon. The marks are detected by a detector disposed near the film. A detector also detects each revolution of the drum. An encoder provides signals indicative of the position of the film. A controller determines the distance between the registration marks using the output of an encoder as a position signal and adjusts the diameter of the drum in response to the determined distance. The controller also determines the position of the seal bars relative to the registration marks and adjusts the diameter of the drum in response to the relative position. A downstream device includes a perforation to seal registration controller with a registration control input. The controller provides a control signal to the registration control input in response to changes in the diameter of the drum.

DESCRIPTION OF THE DRAWINGS

For a better understanding of the invention, reference is made to the accompanying drawings, in which like numerals designate corresponding elements or sections throughout, and in which.

Figure 1:
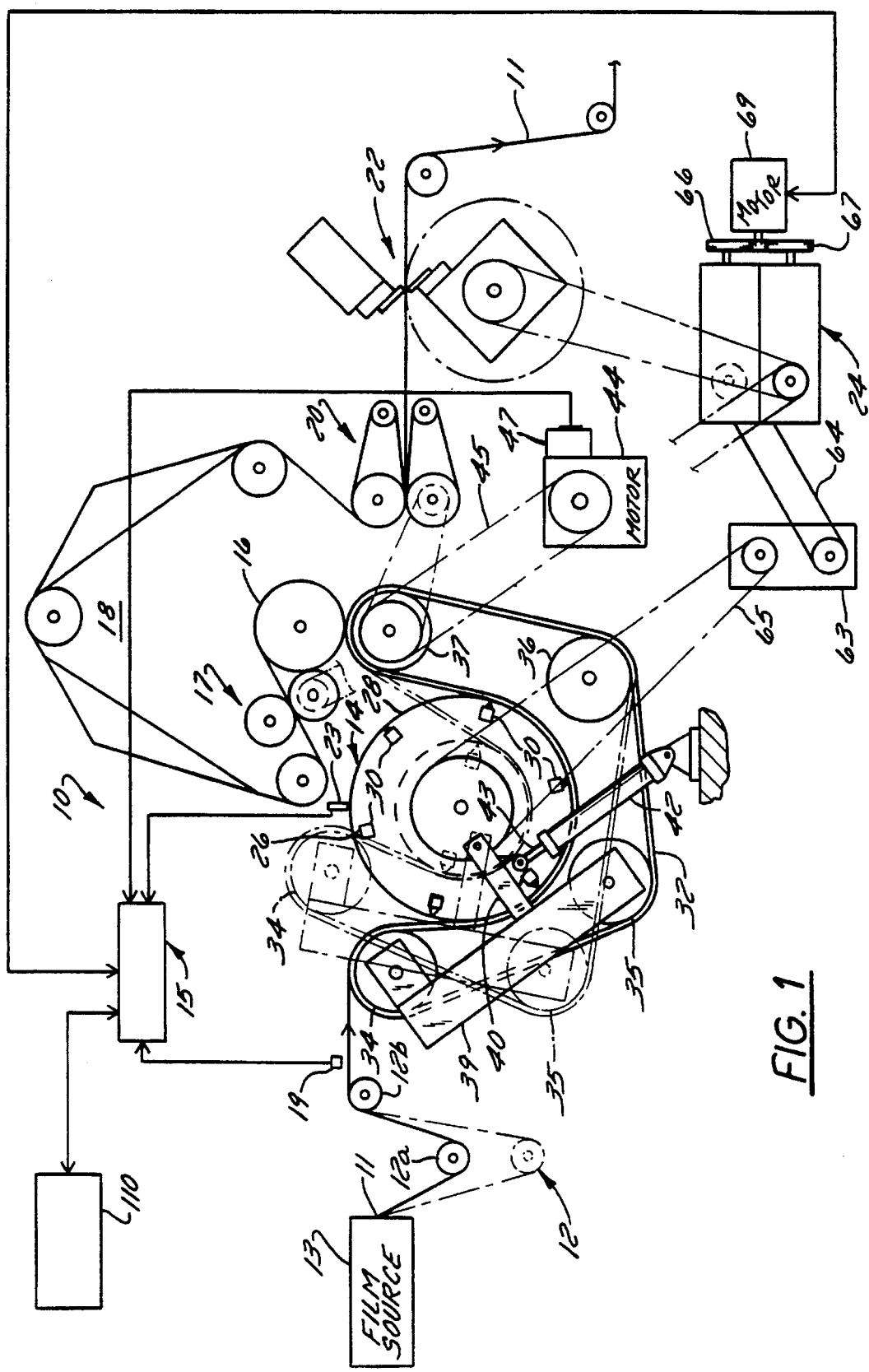
FIG. 1 is a schematic illustration of the bag making machine according to the preferred embodiment of the present invention.

To improve the clarity of the description of the major features of the present invention, only general descriptions are provided for components which are well known in the art, and could be variously embodied by one of ordinary skill in the art after reading and understanding the principles of the present invention, and/or are specifically described in the '084 and '993 patents.

DESCRIPTION OF THE PREFERRED EMBODIMENT

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The major elements of a bag making machine 10 include a dancer and idler assembly 12, a sealing drum and blanket assembly 14, a chill roll 16, a controller 15, a punching station 17, a folding station 18, a pull roll system 20, a perforator/cutting station 22 and a phase variator assembly 24. The present invention is primarily concerned with the sealing drum and blanket assembly 14, controller 15 and phase variator 24, or any other downstream device, as applied to plastic bag making machines and other machines in which a specific function is to be performed in a preselected spacing relationship to preprinted matter on pliable material.

The elements of the system shown in FIG. 1 may be configured in other ways, including removing elements shown therein. Likewise, the bag making machine 10 may have other elements added depending on the type of product being produced. For purposes of illustration, the basic system of the '084 patent will be used herein but should not be deemed limiting in any way. As noted above, this system can be employed in any mechanism wherein certain functions are to be performed in a specific spacing relationship to preprinted matter on a stream of pliable material.

Film 11 is fed in the direction of the arrows from a source of plastic tubing 13 through a dancer roll 12a and an idler roll 12b into the sealing drum and blanket assembly 14. Source 13 may be any source for printed plastic material such as an extruder, a preprinted roll of plastic film, or a printer on which the plastic is imprinted. Dancer roll 12a and idler roll 12b maintain proper tension and speed for the bag making system.

The sealing drum and blanket assembly 14 consists of a cylindrical drum 28, which is capable of being varied in diameter. That feature is illustrated in FIG. 1 by the dotted circle illustrating a smaller diameter. A number of sealing bars 30 are also shown in FIG. 1 and periodically form cross seals across the flattened film tube 11. Sealing bars 30 are of conventional design and are disclosed in detail with respect to construction and operation in the '084 patent. A blanket 32 is mounted on rollers 34, 35, 36 and 37 for surrounding a portion of drum 28 in such a way that the film 11 passes between blanket 32 and drum 28 while seals are being formed. Rollers 34 and 35 are mounted to an elongate frame 39 which is pivotable between the solid and dotted line positions shown in FIG. 1. Frame 39 includes a perpendicular plate 40 near its midsection, the latter being coupled to an air cylinder 42 having an extensible rod 43. It will be appreciated that extension of rod 43 causes rollers 34 and 35 to move to the dotted line position when the drum diameter decreases, thereby maintaining tension of blanket 32 against drum 28.

Roller 37 is driven from a gear motor 44 by belt 45 to drive blanket 32, and in turn blanket 32 will rotate drum 28 due to the tension between these components. Motor 44 includes an encoder 47 which generates a position signal each revolution of motor 44. Alternative encoder locations are on roller 37 or roller 36. A detector 23, such as an electric eye or magnetic sensor is positioned directly above drum 28 and generates a signal when a small metal or magnetic protrusion 26 on drum 28 passes, i.e. each revolution of drum 28. From the output of encoder 47 and detector 23 the circumference of drum 28 and the linear travel of film 11 are determined by controller 15. In an alternative embodiment encoder 47 may be mounted via a pulley to roller 37 or roller 36.

After passing chill roll 16, the film 11 next passes through an optional punching station 17 which punches preselected hole and handle configurations in the film. Thereafter, the film may be further processed as shown or in any other appropriate manner.

Variator system 24 is driven from a gear box 63 by belt 64. Gear box 63 is driven by drum 28 through belt 65. Variator system 24 also includes a pair of gears 66 and 67, used to vary the phase of the perforator/cutting station 22 and punching station 17, respectively, or any other type of downstream station. Adjustments to the perforation to seal phase are made at the perforator/cutting station 22 by activating motor 69 which drives gears 66 and 67. As will be explained below, the phase may be automatically adjusted when the diameter of drum 28 is adjusted, in order to keep the skirt length appropriate. In an alternative embodiment the adjustment may be made by hand.

Figure 2:
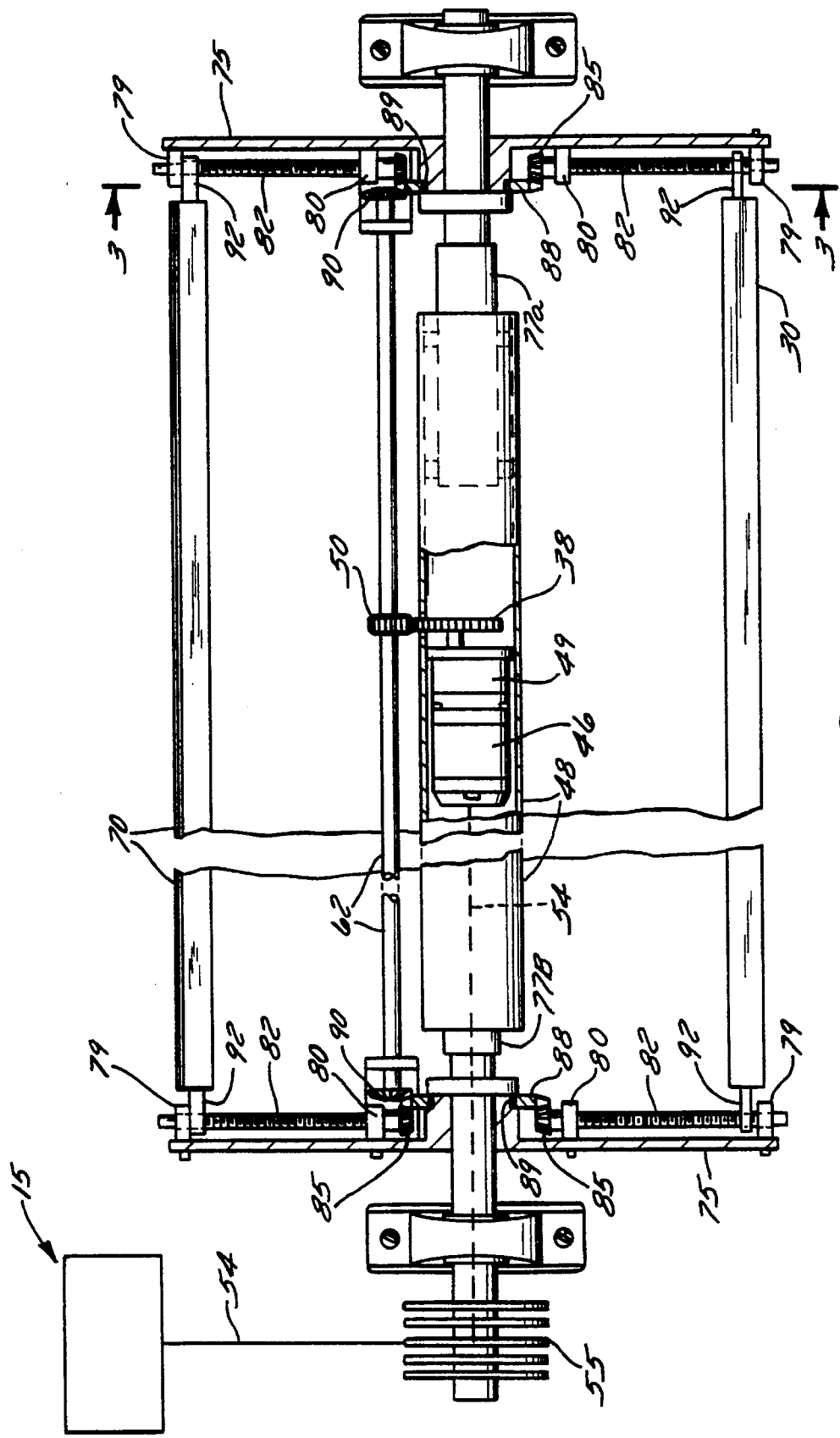
FIG. 2 is a longitudinal elevation (partially in section) of the expandable sealing drum according to the preferred embodiment of the present invention.
Figure 3:
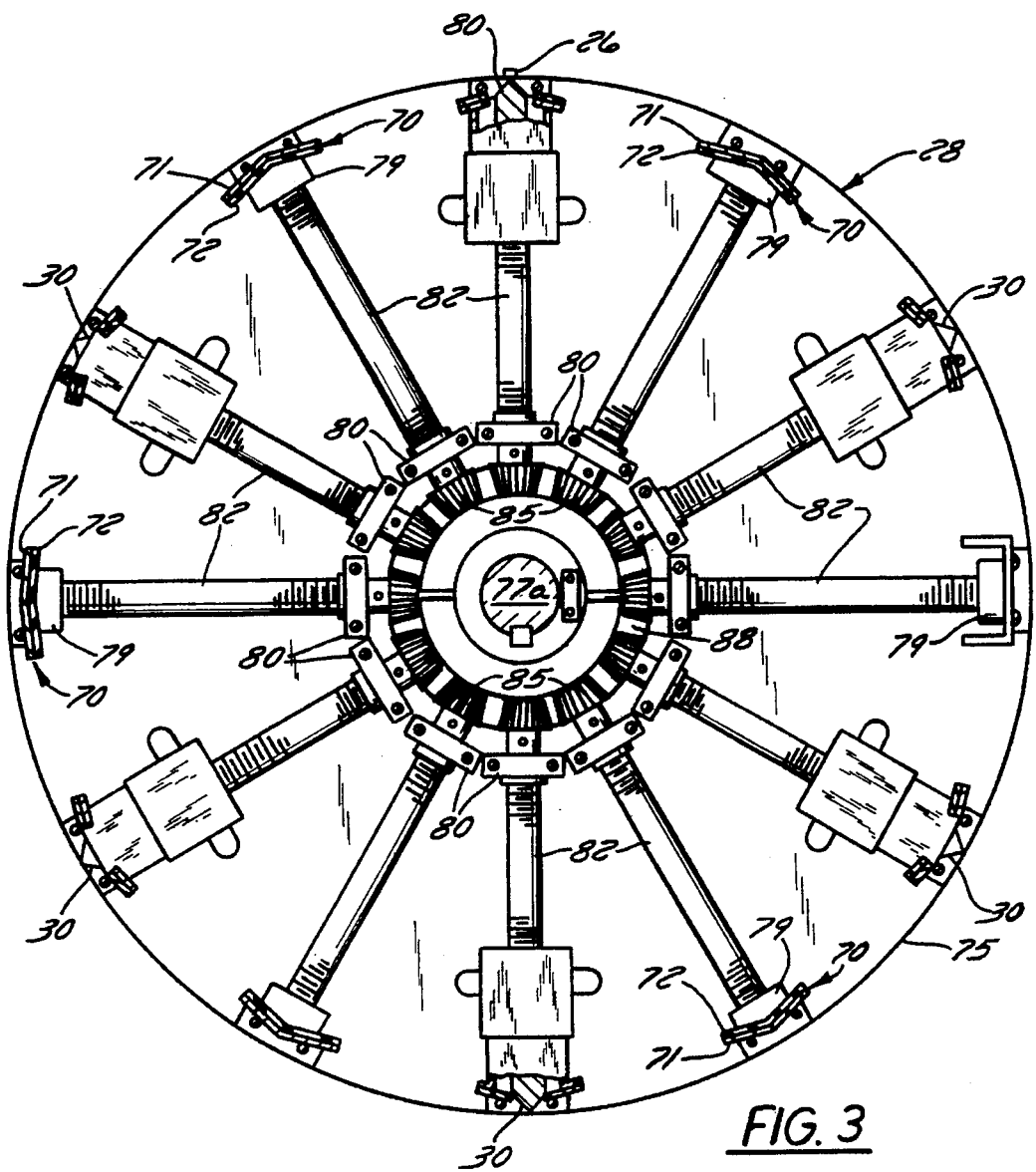
FIG. 3 is a cross-sectional view taken along the line 3—3 of FIG. 2.
Figure 4:
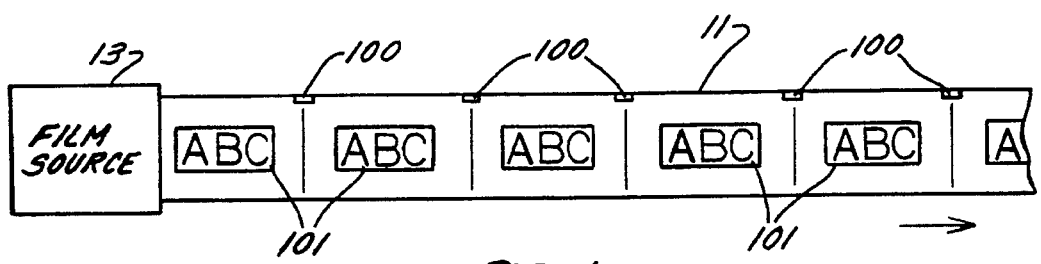
FIG. 4 is a perspective view of a length of printed plastic film as used in the preferred embodiment of the present invention.

Proceeding now to the more detailed description of the preferred embodiment of the present invention, reference is also made to FIGS. 2 and 3 to illustrate the expandable sealing drum 28. Drum 28 is generally cylindrical and is comprised of a plurality of elongate slats 70 and a plurality of sealing bars 30. Each slat 70 includes a steel base 72 having a slightly curved exterior surface. A rubber lagging 71 is provided on the exterior surfaces to assist in maintaining proper traction between blanket 32 and drum 28.

Drum 28 also has a pair of generally circular end plates 75 and axial shaft sections 77a and 77b extending through the center of drum 28 and mounted in suitable bearings to permit rotation of drum 28. Mounting plates 79 having holes therein are attached to the interior sides of each of end plates 75 near the outer edge thereof, the axis of the openings of each plate 79 being at 90° with respect to the axis of shaft sections 77a and 77b. Similar plates 80 are affixed to end plates 75 inwardly of plates 79 so that the pairs of spaced apart mounting plates (79 and 80) are disposed equidistantly around each end plate 75. In one embodiment 6 pairs of mounting plates are used. In a second embodiment 12 pairs, or a different number of mounting plates are used.

A threaded rod 82 is placed through the holes in each pair of plates 79 and 80. A mitre gear 85 is mounted on the inner end of rod 82. Rotation of mitre gear 85 causes rotation of rod 82.

A pair of mitre ring gears 88 are rotatably mounted to a machined surface of shaft sections 77a and 77b on bearings 89 and are constructed and arranged to mesh with mitre gears 85. Rotation of ring gears 88 causes rotation of all mitre gears 85 and threaded rods 82 which are coupled to each mitre gear ring 88.

Slats 70 are coupled to and supported by threaded rods 82 by a threaded plate 92 fastened to each end of slats 70. Rotation of the rods 82 will cause plates 92 to travel up and down the length of the rods. Rotation of a rod 82 in one direction will cause the slats 70 to move radially inward, reducing the drum diameter, while rotation in the opposite direction will cause a drum diameter expansion. In alternative embodiments supports other than threaded rods may be used, such as ball nuts and ball screws.

Rotation of rods 82 is accomplished by a motor 46 mounted in tube 48. Tube 48 is a hollow tubular section coaxially joining shaft sections 77a and 77b. Pinion 38 on gear box 49 is run by motor 46 and engages a gear 50 mounted on a rod 62. Rod 62 extends the length of drum 28 and pinion gears 90 at each end of rod 62 engage ring gears 88.

Rotation of pinion 38 by motor 46 causes rod 62 to rotate ring gear 88 and rods 82, thereby reducing or enlarging the diameter of drum 28. Motor 46 is energized by controller 15 through wires 54 which are connected to wires extending through shaft section 77b and tube 48 via slip rings 55.

In an alternative embodiment rod 62 may be replaced with a chain which directly drives one rod 82 at each end of drum 28. The chain driven rod 82 then drives ring gear 88, which in turn drives the remaining rods 82.

Controller 15 preferably includes a CPU (or any other digital logic device) and receives as inputs the outputs from a detector 19 and encoder 47. Controller 15 could alternatively include analog logic circuits or any other device that provides the proper outputs in response to the inputs. Detector 19 is an electric eye that detects a plurality of registration marks 100 on film 11, and is located above the path of film 11. A firmly mounted and flat surface provides a consistent optical background for detector 19 so that registration marks 100 on the film 11 can be read accurately. In an alternative embodiment the detector 19 may detect a distinguishing feature in the printed pattern rather than a specific mark for such purpose. And in a further alternative embodiment, the controller can ignore detection of printed matter on the web between specific selected features in the printed matter or between marks printed for the purpose of registration to the printed pattern.

While the operation of the bag machine of the present invention will be described with specific reference to the configuration of the '084 patent and a machine for producing plastic, it should be understood that the principles taught herein have numerous other applications. Therefore, application of the subject matter should not be limited just to plastic bag making machines.

Controller 15 includes an input from an operator interface 110, such as a VDT (video display terminal) and a keyboard. Operator interface 110 allows the operator to use one or more of a variety of features, such as, but not limited to, automatic nominal or average bag length detection, preset average or nominal bag length, automatic adjustment for variations in bag length, manual adjustment for variations in bag length, automatic phase control for skirt length and manual phase control for skirt length.

Initially, film 11 is fed in the direction of the arrows from film source 13 through the dancer and idler rolls to the blanket and drum assembly 14. As the film passes over the idler roll 12b, detector 19 reads the position of the registration mark 100 relative to the activated seal bars' position generated by detector 23, determined from the input from encoder 47. In the fully automated mode controller 15 can determine the nominal bag length (spacing between marks), as well as variations from the nominal bag length. Appropriate activation of motor 46 and adjustment to the drum size is then made, as well as the appropriate phase adjustment for controlling the seal to print registration. For example, if the seal bar position is progressively moving away upstream from the registration mark on the film, then the drum size is too small and motor 46 will be activated to decrease the drum diameter. When the seal bar holds its position relative to the registration mark 100, drum 28 is then set at the proper diameter.

At this point, seal bar spacing, as measured along the drum circumference, is equal to registration mark spacing, but the registration of the seal on the web with respect to the registration mark may not be correct. A shift may then be required to bring each seal and corresponding registration mark 100 into proper spacing. This is also accomplished with controller 15 through its automatic control of the drum size. Similarly, the perforator/cutting station 22 would also need adjustment to control the perforation to seal registration (skirt length).

In order to change the seal to registration mark spacing the drum size is altered temporarily to allow the registration mark 100 to "move" closer to the seal. As an example, if the registration mark needs to be moved closer to the seal, the drum size is altered to establish a known rate of advancement of the registration mark 100 toward the seal on each revolution of drum 28. When enough revolutions are completed, drum 28 is returned to its proper size and normal operation ensues. However, the temporary change in drum size to correct the seal to registration mark spacing will cause a temporary shift in the perforation to seal spacing (skirt length). Thus, the phase of perforator/cutter 22 is temporarily adjusted to maintain the skirt length at the desired value. The following example is illustrative of how this is accomplished, but is not in any way limiting on the use of the equipment or the components therein.

If the seal location with respect to the registration mark is six inches from the desired seal location with respect to the registration mark, the drum circumference may be reduced by ½ inch. Thus, after every revolution of drum 28, the registration mark is ½ inch closer to the seal. After 12 revolutions, the seal and registration mark will be properly spaced. Drum 28 is then expanded to the original circumference and normal operation of the machine may recommence.

While the proper drum diameter and seal to registration mark spacing are being obtained by controller 15 the skirt length needs to be temporarily adjusted. The perforator cutting station 22 is mechanically linked to drum 28. When the diameter of drum 28 is changed the speed of perforator cutting station 22 is simultaneously changed. However, there is a propagation delay while the bag at drum 28 travels along the film path until it reaches perforator cutting station 22. During this propagation delay the phase of the perforator/cutting station must be corrected to compensate for the instantaneous change in the speed of the perforator cutting station. Controller 15 provides the proper signal to motor 69 to temporarily compensate for the propagation delay at the time it sends the signal to adjust the diameter of drum 28.

Controller 15 also allows the presetting of the nominal bag length prior to threading film 11 through the machine. The operator can input the desired length, and controller 15 can cause the diameter of the drum to be adjusted until the preset diameter is obtained. Of course, the machine must be running in order to accomplish this.

In summary, controller 15 determines the spacing between print registration marks using inputs from detector 19 and encoder 47 determines the circumference of drum 28 using inputs from detector 23 and encoder 47. Controller 15 then calculates the arc length distance between active seal bars along the circumferential path of drum 28 and adjusts the drum circumference so that the arc length distance between active seal bars matches the distance between print registration marks. Controller 15 also measures the position of the seal bar relative to the print registration mark and automatically adjusts the relative placement of the seals in relationship to the print registration mark to a fixed distance, responding to changes in the print mark spacing on the printed web as they occur.

The location of a seal bar with respect to the print registration mark is determined by first counting encoder pulses from the time detector 19 detects a registration mark until the time detector 23 detects protrusion 26, located on the circumference of a drum end plate 75, in direct radial alignment with a seal bar location. Secondly, the distance from the detector 19 position along the web path to the lowest point on the drum circumference is known as a function of drum circumference. Using the encoder measurement, the known path length, and the known mark spacing, the actual and desired spacing between seal and registration mark can be calculated and compared.

During normal operation of the machine, plastic film 11 is fed from the roll 13 through the dancer roll 12a and idler roll 12b to the blanket and drum assembly 14 where heat seals are applied. The plastic film may be configured so that the seals define the bottoms of plastic bags being formed. Alternatively, the seals may define the sides of the bags. In this situation, the plastic film 11 is slit longitudinally down the middle, the middle slit being the top opening of each bag being formed.

Utilizing the drum sizing and the seal to registration mark registration functions of controller 15, seals may be consistently placed in proper orientation to any printed matter appearing on the film. As the film 11 leaves the blanket and drum assembly 14, it encounters chill roll 16 which cools the heat seals.

The plastic is next fed to punching station 17 where handles may be punched into or out of the plastic and the bag's configuration may be further defined. For example, "t-shirt" bags are quite popular in supermarkets and grocery stores at present. These bags have a lower bag section and two handles that resemble the shoulder straps of a tank top t-shirt. This configuration may be punched on the apparatus shown.

From punching station 17, the film may be fed to folding station 18 as disclosed in the '084 patent. From folding station 18 film 11 may next move to the perforator/cutting station 22 where perforations can be placed between bags or where the bags may be completely separated. As shown in the '084 patent, the separation between bags may also be partially slit, partially perforated. The bags then move on to a packaging operation.

In the preferred embodiment, punching station 17 and perforator/cutting station 22 and any other downstream devices are run off of the same gear box 63 connected to drum 28. As described above controller 15 causes adjustments to be made to variator system 24 so that there is no phase variance between seals, handle cuttings and perforation or cutting.

As an alternative embodiment, a separate servo motor is used to drive the perforator/cutting station 22 and a further separate servo motor is used to drive the punching station 17. In this embodiment, the controller maintains the relative speed and position of the two added servo motors to the rest of the machine using encoder feedback signals from each servo motor and a master encoder signal from an encoder connected either directly or indirectly via belt and pulleys to the drum shaft 111.

In a second alternative embodiment the variator system 24 may be composed of a special planetary gear box system known as a phase variator. As a third alternative embodiment, there may be two of these phase variator devices, one in the drive system to the punching station and one in the drive system to the perforation/cutting station. Thus, the punching station may also have a motor on its phase variator to allow the controller 15 to control punch to seal registration independently from perforation to seal registration.

Controller 15 serves one other function during operation of the machine. Through detectors 19 and 23, controller 15 continuously calculates averages of mark to mark spacing (bag length), seal to registration mark spacing (phase), and/or perforation to seal spacing (skirt length). These averages are used as filters to minimize control system "hunting" if widely varied sequential values are measured. The controller also detects and rejects erroneous readings and sends alarm signals to operators if readings vary too much or too frequently.

When the discrepancy reaches a preselected limit, controller 15 resets the nominal spacing and instructs motor 46 to make a minor adjustment in the size of drum 28 to compensate. The drum diameter may be slightly increased or decreased. This compensation function is continuous and ongoing so that the printed matter 101 is maintained in a consistent position on the bags.

While one preferred embodiment of the present invention is shown in the Figures and described in detail herein, modifications and variations could be developed by one of ordinary skill in the art after the objects of the invention are understood. For example, in any operation in which a specific function such as perforation or punching needs to be performed on a continuous stream of pliable material (e.g., paper or cloth) having printed matter thereon, in a preselected spacing relation, this system can easily be adapted to perform efficiently and easily. Accordingly, the present invention is not to be limited to the specifically disclosed preferred embodiment, but rather only by the scope of the claims which follow.

The embodiments of the invention in which an exclusive property or privilege is claimed are defined as follows:

1. An apparatus for making plastic bags from plastic film having a plurality of registration marks comprising:

a cylindrical drum with a variable diameter, a circumference, an axis and at least one seal bar substantially parallel to the axis and defining the circumference, wherein the at least one seal bar seals the plastic bags;

a sensor disposed to detect the rotation of the drum;

a registration mark detector disposed to detect the registration marks;

an encoder;

means for determining the nominal length of the bags from the detection of the registration marks and the rotation of the drum;

means for adjusting the diameter of the drum in response to the nominal bag length;

seal phase means for determining a phase of the registration mark relative to the seal on the plastic bag;

means for temporarily adjusting the diameter of the drum in response to the phase of the registration mark relative to the seal on the plastic bag; and a device located downstream from the drum that processes the plastic film and means for adjusting the speed of the device in response to the nominal bag length.

2. The apparatus of claim 1 further including downstream phase means for determining a phase of the device relative to the seal on the plastic bag and means for temporarily adjusting the speed of the device in response to the phase of the device relative to the seal on the plastic bag.

3. The apparatus of claim 2 wherein the device is a perforator.

4. The apparatus of claim 2 wherein the device is a die cutter.

5. A method for making plastic bags from plastic film having a plurality of registration marks using a bag making machine having a cylindrical drum with a variable diameter, a circumference, an axis and at least one seal bar substantially parallel to the axis and defining the circumference, comprising, detecting the rotation of the drum;

detecting the registration marks on the film;

determining the nominal length of the bags from the detection of the registration marks and the rotation of the drum;

adjusting the diameter of the drum in response to the nominal bag length;

determining a phase of the registration mark relative to a seal on the plastic bag;

temporarily adjusting the diameter of the drum in response to the phase of the registration mark relative to the seal on the plastic bag; and processing the plastic film downstream from the drum and adjusting the speed of the process in response to the nominal bag length.

6. The method of claim 5 further including the step of determining a phase of the process relative to the seal on the plastic bag and temporarily adjusting the speed of the process in response to the phase of the process relative to the seal on the plastic bag.

7. The method of claim 6 wherein the process includes perforating the plastic film.

8. The method of claim 6 wherein the process includes die cutting the plastic film.

9. An apparatus for making plastic bags from plastic film having a plurality of registration marks comprising:

a cylindrical drum with a variable diameter, a circumference, an axis and at least one seal bar substantially parallel to the axis and defining the circumference, wherein the at least one seal bar seals the plastic bags;

a sensor disposed to detect the rotation of the drum;

a registration mark detector disposed to detect the registration marks;

a controller, connected to receive a first input from the sensor and a second input from the detector, wherein the controller has a first signal indicative of the nominal length of the bags;

a motor responsive to the first signal and connected to the drum, wherein the diameter of the drum is adjusted in response to the nominal bag length;

further wherein the controller has a second signal indicative of a phase of the registration mark relative to the seal on the plastic bag;

the motor being responsive to the second signal, wherein the diameter of the drum is temporarily adjusted in response to the second signal; and a processing device located downstream from the drum, and a second motor, responsive to the first signal, connected to the processing device, wherein the speed of the processing device is adjusted in response to the nominal bag length.

10. The apparatus of claim 9 wherein the controller has a third signal indicative of a phase of the device relative to the seal on the plastic bag and wherein the second motor is responsive to the third output and the speed of the device is temporarily adjusted in response to the phase of the device relative to the seal on the plastic bag.

11. The apparatus of claim 10 wherein the device is a perforator.

12. The apparatus of claim 10 wherein the device is a die cutter.

13. The apparatus of claim 9 wherein the first and second signals are digital signals and the controller includes a microprocessor.

14. The apparatus of claim 1 wherein the first and second signals are analog signals and the controller includes an analog circuit.

* * * * *